United States Patent [19]

Chapman

[11] 4,231,447
[45] Nov. 4, 1980

[54] MULTI-LAYER ACOUSTIC LININGS
[75] Inventor: John F. Chapman, Solihull, England
[73] Assignee: Rolls-Royce Limited, London, England
[21] Appl. No.: 22,177
[22] Filed: Mar. 20, 1979
[30] Foreign Application Priority Data Apr. 29, 1978 [GB] United Kingdom ............... 17148/78

[51] Int. Cl.³ .............................................. E04B 1/82
[52] U.S. Cl. .................................. 181/213; 181/286; 181/292; 181/293; 181/294
[58] Field of Search ............... 181/213, 286, 288, 291, 181/292, 293, 294

[56] References Cited
U.S. PATENT DOCUMENTS

| | | | |
|---|---|---|---|
| 3,819,007 | 6/1974 | Wirk et al. | 181/286 |
| 3,913,702 | 10/1975 | Wirt et al. | 181/286 |
| 3,991,848 | 11/1976 | Davis | 181/286 |
| 4,100,993 | 7/1978 | Feder | 181/213 |
| 4,135,603 | 1/1979 | Dean et al. | 181/286 |
| 4,150,732 | 4/1979 | Hoch et al. | 181/213 |
| 4,158,401 | 6/1979 | Matsumoto et al. | 181/286 X |

Primary Examiner—Donald A. Griffin
Assistant Examiner—Benjamin R. Fuller
Attorney, Agent, or Firm—Cushman, Darby & Cushman

[57] ABSTRACT

A multi-layer acoustic lining is of the type having core compartments rendered effective as Helmholtz resonators by means of resonator necks projecting from the core facing layer into the core compartments. In order to broaden the frequency response, those ends of the resonator necks which project into the core compartments are bevelled so as to give the necks a less well defined length. The acoustic lining is particularly for application to the jet pipe or fan duct of a turbofan aeroengine.

5 Claims, 6 Drawing Figures

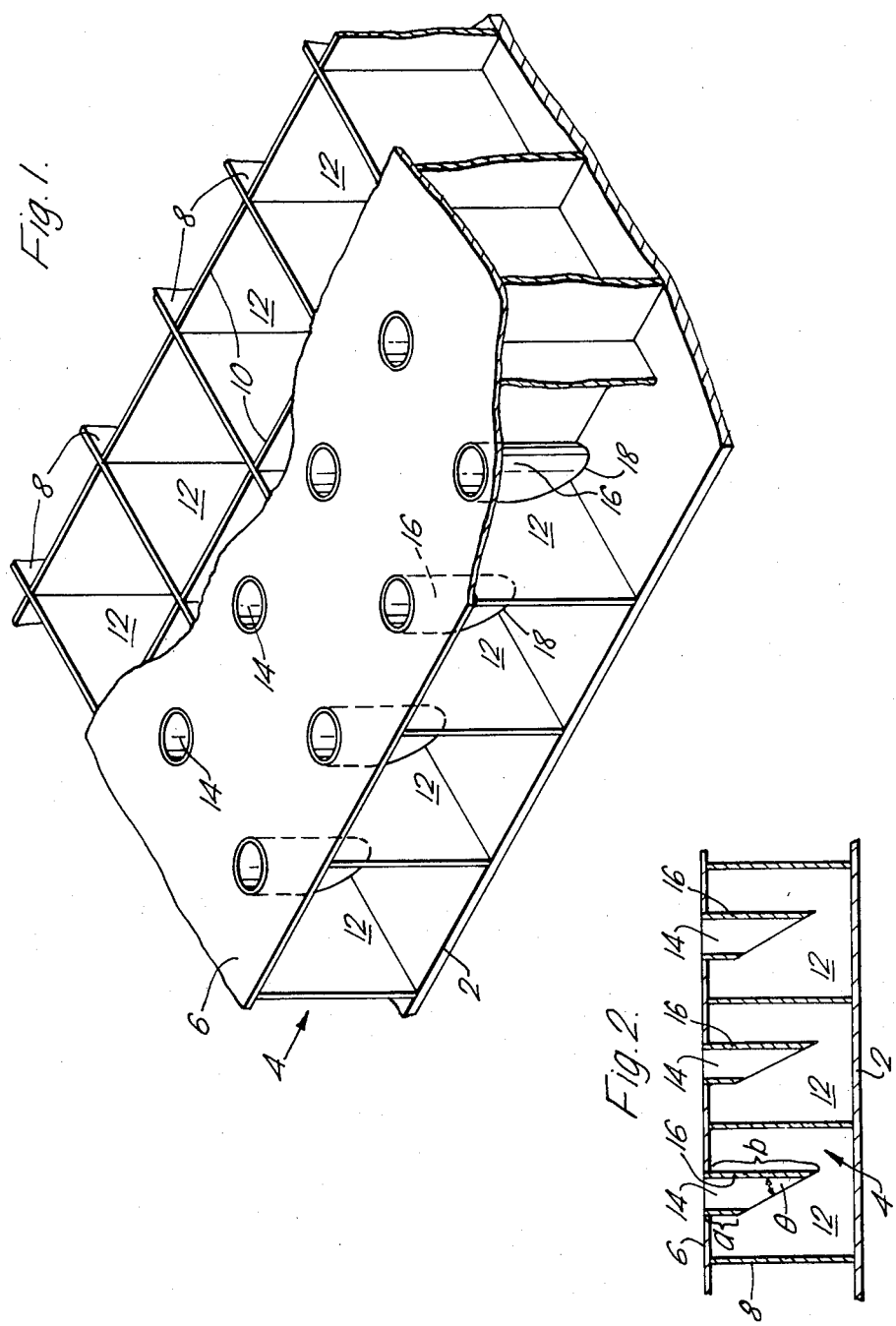

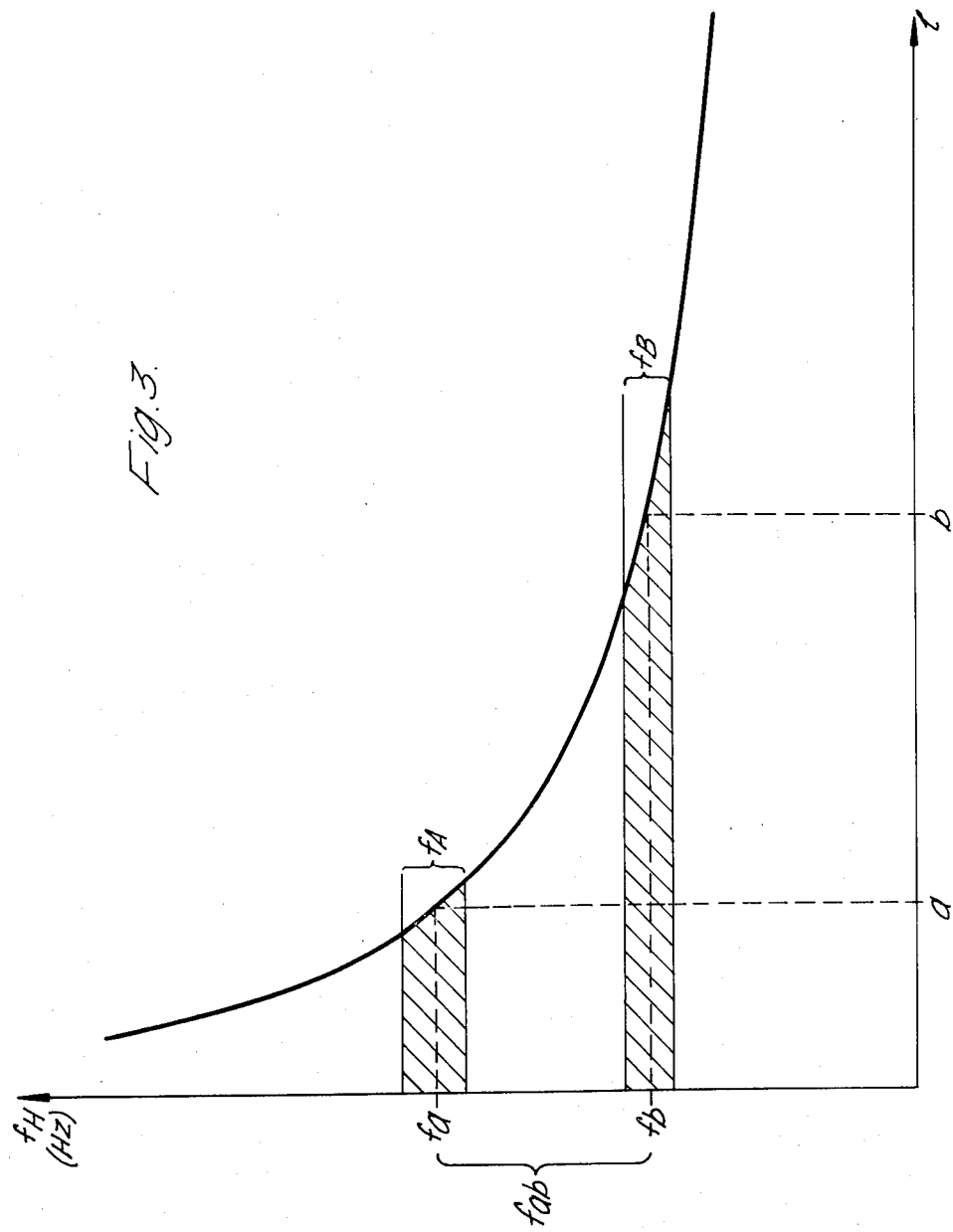

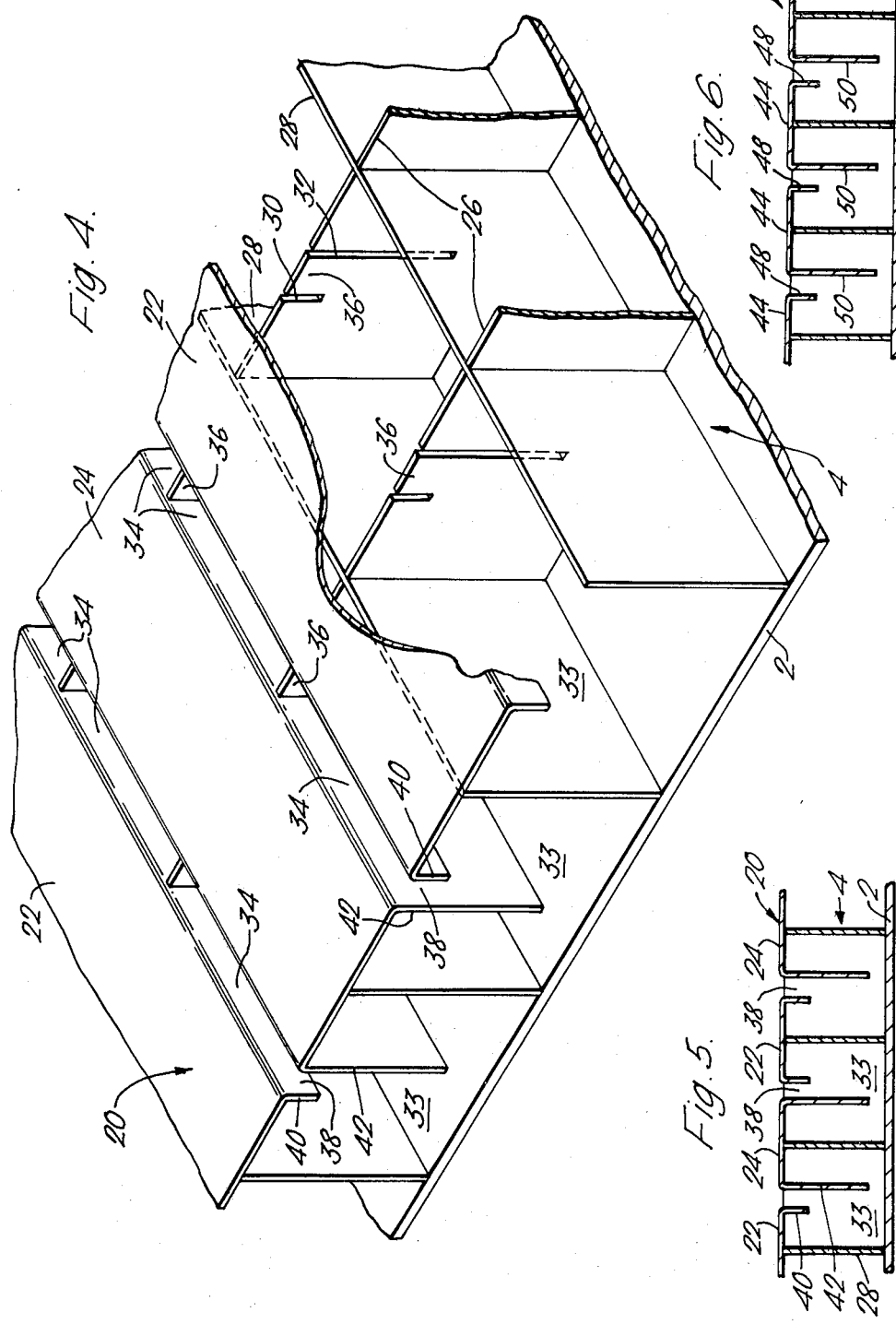

MULTI-LAYER ACOUSTIC LININGS

The present invention relates to multi-layer or "sandwich" type acoustic linings for fluid-flow ducts, such as the intake or exhaust ducts of gas turbine aeroengines. Such acoustic linings usually comprise an impermeable backing layer, a fibre-filled or compartmented-airspace core and a sound-permeable core facing layer through which sound energy can enter the core.

A major objective in present-day design of acoustic linings for gas turbine engines, particularly in design of acoustic linings for the jet pipes of gas turbine aeroengines and for the fan ducts of ducted fan gas turbine aeroengines, is to achieve a construction which is effective in absorbing noise over a broad range of frequencies, but which preferably is also economical in terms of the volume it occupies, its weight, and its mode of fabrication.

A multi-layer acoustic lining is known in which a bulk fibre-filled or compartmented-airspace core is provided with a plain permeable core facing layer. The core facing layer is in the form of a sheet fabricated from sintered or felted metal or other porous materials having relatively large flow resistances. This acoustic lining has the property that the resistive component of its acoustic impedance is essentially constant over a broad range of frequencies, which has the consequence that of the core facing layer is designed to allow the structure to absorb low frequencies efficiently, the efficiency at higher frequencies is reduced.

This problem is partially overcome in U.S. Pat. No. 3,819,007 by providing a compartmented airspace core with a permeable facing layer having apertures through it, each aperture having a collar in the form of a short duct, one end of which is flush with the outer (sound receiving) surface of the facing sheet, the other end of which projects into the interior of a respective compartment of the core. In this way, the concept of a permeably faced multi-layer type of acoustic lining is combined with an array of Helmholtz resonators provided with necks situated internally of the resonant volumes. An acoustic lining so constructed can be designed to have good broad-band high-frequency absorbing properties by virtue of the permeable facing whilst at the same time possessing good absorbing properties over a relatively narrow band of low frequencies centred around a particular low frequency to which the resonators are tuned. Furthermore, such an acoustic lining is also economical in its use of space, due to the fact that the Helmholtz resonator necks are provided internally of the resonant volumes.

However, a problem still remains if it is desired to absorb efficiently a broader band of low frequencies using such an acoustic lining, due to the relatively narrow-band frequency response of the Helmholtz resonators.

According to the present invention, a multi-layer acoustic lining for a fluid flow duct comprises an air-impermeable backing layer, a compartmented-airspace core structure, and a core facing layer overlying the compartments and having apertures therein through which sound energy can enter the core compartments, said compartments being rendered effective as Helmholtz resonators by means of suitable Helmholtz resonator necks which project into said core structure from said facing layer and communicate with said apertures; wherein, in order to broaden the frequency response of said resonators, that end of each said neck which projects into a compartment is of bevelled or biased configuration such that the end lies in a plane extending at an acute angle with the body of said neck.

As applied to the jet pipe of a gas turbine aeroengine or the fan duct of a ducted fan gas turbine aeroengine, such an acoustic lining would be designed so that the Helmholtz resonators absorb a low frequency band present in the jet pipe or fan duct. In order to render the acoustic lining suitable for absorbing a high frequency band also, the core facing layer is preferably an air-permeable sheet material which, apart from the aforesaid apertures in it, preferably has a relatively high resistance to airflow through it. The core facing layer may be fabricated from sintered or felted metal fibre or other suitable porous materials.

As an alternative way of rendering the acoustic lining suitable for absorbing a high frequency band, the core facing layer may comprise an impermeable material which, besides having the aforesaid apertures in it, is also provided with perforations through which sound energy can enter the core compartments.

In one embodiment of the invention, the aforesaid apertures are circular, the resonator necks communicating therewith also being circular in cross-section.

In a further embodiment of the invention the apertures are quadrilateral (e.g. rectangular) in shape and the resonator necks are ducts of like quadrilateral cross-section. In this case the core facing layer may comprise a plurality of elongate sheet pieces disposed in side-by-side spaced apart relationship, the apertures in the core facing layer being defined between adjacent side edges of adjacent sheet pieces and the sheet pieces being channel-shaped in cross-section, each channel-side or flange extending into the core structure as part of each one of a plurality of Helmholtz resonator necks, the remaining parts of said necks being composed of cooperating portions of the core structure.

To achieve the bevelled ends of the resonator necks characteristic of the invention, first and second types of channel section sheet pieces may be utilized, the first type having short flanges and the second type having longer flanges, the core facing layer being assembled from the channel section sheet pieces such that the first and second types of sheet pieces are alternated with each other in succession across the extent of the acoustic lining. Alternatively, the channel section sheet pieces may be identical, each sheet piece having one flange longer than the other, the sheet pieces being assembled to form the core facing layer such that the shortest flange of each sheet piece is paired with the longest flange of the adjacent sheet piece.

In an axial fluid flow duct, an acoustic lining having a facing comprising channel section sheet pieces as described above would be installed such that the sheet pieces extend circumferentially around the duct.

Embodiments of the invention will now be described, by way of example only, with reference to the accompanying drawings in which:

FIG. 1 is a partly "cut-away" perspective view of a first basic embodiment of the invention;

FIG. 2 is part of a cross-section of the structure of FIG. 1;

FIG. 3 is a graph showing the general relationship between resonant frequency and resonator neck length;

FIG. 4 is a partly "cut-away" perspective view of a second embodiment of the invention;

FIG. 5 is part of a cross-section of the structure of FIG. 4.

FIG. 6 is part of a cross-section showing a variation of the basic embodiment of FIGS. 4 and 5.

Referring to FIGS. 1 and 2, a multi-layer acoustic lining for a fluid flow duct, such as the jet pipe of a gas turbine aeroengine or the fan duct of a by-pass gas turbine aeroengine, comprises an air-impermeable backing layer 2, a compartmented airspace core 4, and a core facing layer comprising a sheet material 6. The core facing sheet 6 overlies and is fixed to the edges of intersecting wall members 8, 10 etc. which define core resonator compartments 12.

The facing sheet 6 has apertures 14 in it, through which sound energy from the flow duct can enter the core resonator compartments 12. Compartments 12 are designed to be effective as resonators of the Helmholtz type due to the provision of resonator necks 16 which project into compartments 12 from the underside of facing sheet 6 and are located and fixed in apertures 14, again using any suitable means. In this embodiment the necks 16 are in the form of tubes having a circular cross-section with the ends of the necks which extend into the compartments being spaced from the walls thereof. Thus, each resonator compartment 12 communicates with the sound-receiving surface of the facing sheet 6 via its own resonator neck 16.

Were the resonator necks 16 to be merely plain tubes as in the prior art, the planes of the tube ends within the resonator compartments 12 being at right angles to the necks' longitudinal axes, i.e. at right angles to the bodies of the necks, there would be only a relatively narrow frequency band width for absorbing low frequencies over which absorption efficiency would be good. In order to broaden the frequency band width for absorbing low frequencies over which sound absorption efficiency can be considered good, i.e. in order to broaden the "frequency response" of the resonator compartments 12, it will be seen from FIGS. 1 and 2 that the end 18 of each resonator neck 16 which projects into a compartment 12 is bevelled or arranged on a bias to the axis of the neck, such that the plane of each such end 18 makes an acute angle $\theta$ with the body of the respective neck 16.

In order to illustrate the utility of the invention, consider the equation defining frequency ($f_H$) of the type of Helmholtz resonator presently being described:

$$f_H = \frac{C}{2\pi} \sqrt{\frac{A}{ld}}$$

where
C = speed of sound
A = open area ratio of cell = sound receiving area of neck ÷ area of cell.
l = length of neck
d = depth of cell.

If A and d are considered constant, then it can be seen that the equation can be simplified to:

$$f_H = K \sqrt{1/l},$$

where K is a constant.

If values of $f_H$ are plotted against l, a graph having the general form of FIG. 3 results. In FIGS. 2 and 3 the length of the shortest part of the necks 16 is represented by a and the length of the longest part of the necks 16 is represented by b. Assuming a prior art resonator neck of length a having an interior end which is not bevelled, i.e. one which the plane of the interior end is at right angles to the body of the neck, the resonant frequency would be $f_a$. Similarly a prior art resonator neck of length b would have a resonator frequency $f_b$. For a prior art neck of length a or length b, the frequency band over which the efficiency of noise absorption exceeds a certain designated value x (which is less than unity) would be, say, $f_A$ or $f_B$ respectively. However, for the present invention, the frequency band over which the efficiency of noise absorption exceeds x would approximate to $f_{ab}$, since some resonance would occur over all band $f_{ab}$, except at or near $f_b$, where the column of air in the resonator neck is not significantly contained by the wall of the neck, and therefore does not move in unison with the air mass in the upper portions of the neck. The better frequency response (as referred to absorption efficiency value x) of the present invention compared to prior art necks of either length a or b is achieved at the expense of the higher absorption efficiencies which are attained by the prior art necks at or very near their resonant frequencies, since the bevelled or biased neck construction ensures that the columns of air inside the necks 16 have an indefinite length, and hence resonator compartments 12 resonate less strongly than they would if the columns of air had a definite length.

When used as an acoustic lining in a duct of a gas turbine aeroengine, the embodiment shown in FIGS. 1 and 2 would be designed so that the Helmholtz resonators absorb a particular low frequency band present in the duct. If the facing sheet 6 is made of a permeable material, such as sintered or felted metal fibres, resin-bonded glass or carbon fibres, or other suitable porous materials, the compartments 12 can also be designed to function after the fashion of "quarter-wave" tube resonators or the like to absorb higher frequencies also present in the duct. This is possible because the resonant frequency of an individual cavity when used as a Helmholtz resonator is different from the resonant frequency of the same cavity when used as a tube resonator. In order to produce high absorption efficiencies over as wide a bandwidth as possible at high frequencies, the facing sheet 6, apart from the apertures 14 in it, should have a relatively high resistance to airflow through it, e.g. of the order of twice to ten times the characteristic impedance of the air in the duct.

An alternative known type of facing sheet 6 which also enables the compartments 12 to function after the fashion of tube resonators comprises an impermeable material, such as sheet metal, which, besides having the apertures 14 in it, also has many small perforations which allow sound energy to enter core compartments 12.

A further basic embodiment of the invention is illustrated in FIGS. 4 and 5. It will be seen that the backing layer 2 and the core structure 4 are basically the same as described and shown with reference to FIGS. 1 and 2, but that the core facing layer 20, instead of being a continuous sheet, comprises a number of elongate sheet pieces 22, 24 having a channel-shaped cross-section, the sheet pieces being set in side-by-side spaced apart relationship to each other. Each channel-shaped sheet piece 22, 24 is secured to wall members 26, 28 which define core compartments 33, and the channel sides or flanges 40, 42 which form the sides of the sheet pieces 22, 24 are received and held in slots 30, 32 in wall members 26. These slots 30, 32 are machined, stamped or otherwise formed in wall members 26, at some convenient stage of manufacture.

The spaces between adjacent sheet pieces 22, 24 of the core facing layer 20, in conjunction with wall portions 36 of wall members 26, form slots or rectangular apertures 34 in the facing sheet 20 through which sound energy can enter the core compartments 33. Apertures 34 lead into their respective resonator necks 38, which are formed by wall portions 36 and pairs of adjacent flanges 40, 42 of the sheet pieces 22, 24.

The bevelled ends of the resonator necks characteristic of the invention are achieved by making sheet pieces 22 with short flanges 40 and sheet pieces 24 with longer flanges 42. The core facing layer 20 is then assembled from the sheet pieces 22, 24 in such a way that the two different types of sheet pieces 22, 24 are alternated with each other in succession across the extent of the acoustic lining. The bevelled ends of the resonator necks are thus the result of the pairing of each short flange 40 with a corresponding long flange 42.

Alternatively, the bevelled ends can be achieved by making all sheet pieces identical, each being formed with one flange shorter than the other flange, as shown in FIG. 6. Here, the identical sheet pieces 44 are assembled to form core facing layer 46 such that the shortest flange 48 of each sheet piece is paired with the longest flange 50 of the adjacent sheet piece.

When utilised in a duct of a gas turbine aeroengine such as a jet pipe or fan duct, an acoustic lining having a facing comprising channel-shaped sheet pieces such as those described in relation to FIGS. 4 to 6 would be installed such that the major dimensions of the sheet pieces extend circumferentially around the duct.

As already explained with reference to the embodiment shown in FIGS. 1 and 2, the embodiments shown in FIGS. 4 to 6 may be provided with core facing layers made of permeable or perforated material so that the acoustic lining is capable of efficiently absorbing both low and high frequencies simultaneously.

When designing acoustic linings such as those shown in FIGS. 1 and 2 and FIGS. 4 to 6 for incorporation in gas turbine aeroengines, care must be taken that the widths of the resonator necks are not so great as to seriously increase the internal drag of the engine and hence reduce its efficiency by an unacceptable amount.

It is possible to produce an aerodynamically better surface for acoustic linings according to the present invention by superimposing an additional facing layer on the core facing layers described herein. Preferably, the additional facing layer is spaced away from the core facing layer by suitable means as described and shown in our co-pending British patent application No. 41134/77 and now published British patent application No. 2005384A. As explained in that patent application, the sound permeable facing layer may be of a sheet material which is inherently permeable to air, such as fibrous metallic sintered material or felt, or an air impermeable sheet material rendered permeable by having many small holes formed through its thickness, such as perforated sheet metal.

The components of the acoustic linings described herein may be joined to each other by suitable means appropriate to the materials of which they are constructed, such as by brazing or suitable adhesive substances.

I claim:

1. For a fluid-flow duct in a gas turbine engine, a multi-layer acoustic lining comprising an air-impermeable backing layer, a compartmented-airspace core structure, a core facing layer overlying said core structure and incorporating apertures having predetermined cross-sections through which sound energy can enter the core, and tube-like Helmholtz resonator necks having bodies with cross-sections substantially the same as the cross-sections of said apertures which extend from said apertures into said core structure such that an end of each resonator neck is situated within a core compartment and spaced from walls thereof to thereby render core compartments effective as Helmholtz resonators; wherein the improvement is that said end of each resonator neck within said core structure is a biased configuration such that said end lies in a plane extending at an acute angle with the body of said neck.

2. A multi-layer acoustic lining as claimed in claim 1 in which the predetermined cross-sections of said apertures in the core facing layer are circular and in which the bodies of said tube-like resonator necks are of circular cross-section.

3. A multi-layer acoustic lining as claimed in claim 1 in which the core facing layer comprises an air-permeable sheet material, which, apart from the apertures therein, has a resistance to airflow therethrough sufficiently high to render the acoustic lining suitable for absorbing a frequency band appreciably higher than the frequency band absorbed by the lining when acting in the Helmholtz mode.

4. A multi-layer acoustic lining as claimed in claim 3 in which the air-permeable sheet material is a metal felt or the like.

5. A multi-layer acoustic lining as claimed in claim 1 in which the core facing layer comprises an air-impermeable sheet material, which, besides having the apertures therein, is also provided with perforations therethrough to render the acoustic lining suitable for absorbing a frequency band appreciably higher than the frequency band absorbed by the lining when acting in the Helmholtz mode.

* * * * *